(12) United States Patent
Lakkis

(10) Patent No.: US 8,856,633 B2
(45) Date of Patent: Oct. 7, 2014

(54) MILLIMETER-WAVE COMMUNICATIONS FOR PERIPHERAL DEVICES

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 12/244,754

(22) Filed: Oct. 2, 2008

(65) Prior Publication Data

US 2009/0094506 A1 Apr. 9, 2009

Related U.S. Application Data

(60) Provisional application No. 60/997,439, filed on Oct. 3, 2007.

(51) Int. Cl.

| | |
|---|---|
| H04L 1/00 | (2006.01) |
| G01R 31/28 | (2006.01) |
| H04L 1/18 | (2006.01) |
| G06F 13/42 | (2006.01) |
| G06F 13/20 | (2006.01) |
| H04L 12/925 | (2013.01) |
| H04L 12/861 | (2013.01) |
| H04L 29/06 | (2006.01) |
| H04L 12/801 | (2013.01) |
| H04L 12/893 | (2013.01) |
| H04L 12/70 | (2013.01) |

(52) U.S. Cl.
CPC ............ *H04L 1/1829* (2013.01); *H04L 1/1835* (2013.01); *H04L 47/722* (2013.01); *H04L 49/9005* (2013.01); *H04L 1/1864* (2013.01); *H04L 1/1874* (2013.01); *H04L 1/1896* (2013.01); *H04L 69/162* (2013.01); *H04L 69/16* (2013.01); *H04L 69/161* (2013.01); H04L 2012/5681 (2013.01); *H04L 47/10* (2013.01); *H04L 47/40* (2013.01); H04L 2001/0097 (2013.01)
USPC ........... 714/799; 714/748; 714/712; 710/106; 710/313

(58) Field of Classification Search
CPC ... H04L 1/1829; H04L 1/1835; H04L 1/1864; H04L 1/1874; H04L 1/1896; H04L 47/10; H04L 47/722; H04L 49/9005; H04L 69/16; H04L 69/161; H04L 69/162; H04L 2012/5681
USPC .................. 714/799, 748, 712; 710/106, 313
See application file for complete search history.

(56) References Cited

U.S. PATENT DOCUMENTS 5,664,151 A * 9/1997 Galles et al. .................. 711/145
6,021,308 A * 2/2000 Kimura ........................... 725/75

(Continued)

FOREIGN PATENT DOCUMENTS

| JP | 2006013952 | 1/2006 |
|---|---|---|
| JP | 2006243866 | 9/2006 |

(Continued)

OTHER PUBLICATIONS

Kang et al., Adaptive Interference-Aware Multi-Channel Clustering Algorithm in a ZigBee Network in the Presence of WLAN Interference, Feb. 5, 2007, IEEE, pp. 200-205.*

(Continued)

Primary Examiner — John J Tabone Jr.
(74) Attorney, Agent, or Firm — Dang M. Vo

(57) ABSTRACT

A wireless device couples an electronic device employing a wired-link protocol to, for example, a wireless personal area network (WPAN). The wireless device comprises a wired interface configured for coupling to the electronic device, a wired transceiver coupled to the wired interface, the at least one wired transceiver configured for functioning as a terminus of a wired link coupled to the electronic device, and a wireless transmitter or transceiver coupled to the wired transceiver and configured for functioning as a terminus of a wireless link in the WPAN. The wireless device may be configured for coupling a plurality of dissimilar wired devices together via a wireless link.

37 Claims, 7 Drawing Sheets

(56) References Cited

U.S. PATENT DOCUMENTS

| | | | |
|---|---|---|---|
| 6,401,149 B1 * | 6/2002 | Dennin et al. | 710/58 |
| 6,772,239 B2 * | 8/2004 | Langton | 710/31 |
| 6,956,832 B1 * | 10/2005 | Muhonen et al. | 370/310 |
| 7,069,373 B2 * | 6/2006 | Teng | 710/310 |
| 7,433,363 B2 * | 10/2008 | Rosen et al. | 370/413 |
| 7,940,788 B2 * | 5/2011 | Soulie et al. | 370/428 |
| 8,635,353 B2 * | 1/2014 | Pope et al. | 709/230 |
| 2002/0147928 A1 * | 10/2002 | Mahajan et al. | 713/201 |
| 2005/0027892 A1 * | 2/2005 | McCabe et al. | 709/253 |
| 2005/0256988 A1 * | 11/2005 | Arendt et al. | 710/305 |
| 2007/0022206 A1 * | 1/2007 | Pope et al. | 709/231 |
| 2007/0064683 A1 | 3/2007 | Furukawa | |
| 2007/0104168 A1 | 5/2007 | Polson | |
| 2007/0121551 A1 * | 5/2007 | Rouffet et al. | 370/332 |
| 2009/0285189 A1 * | 11/2009 | Kim et al. | 370/338 |

FOREIGN PATENT DOCUMENTS

| | | |
|---|---|---|
| JP | 2007074641 A | 3/2007 |
| JP | 2007088775 | 4/2007 |
| KR | 100694298 | 3/2007 |
| WO | 2007066914 | 6/2007 |
| WO | 2007095967 | 8/2007 |

OTHER PUBLICATIONS

Cheolhee Park et al: "Short-Range Wireless Communications for Next-Generation Networks: UWB, 60 GHz. Millimeter-Wave WPAN, and ZigBee" IEEE Wireless Communications, IEEE Service Center, Piscataway, NJ, US, vol. 14, No. 4, Aug. 1, 2007, pp. 70-78, XP0111917.

International Search Report—PCT/US08/078815, International Search Authority—European Patent Office—Mar. 18, 2009.

Written Opinion—PCT/US08/078815, International Search Authority—European Patent Office—Mar. 18, 2009.

Agere Systems, Inc., et al., "Wireless Universal Serial Bus Specification," Revision 1.0, dated May 12, 2005.

Taiwan Search Report—TW097138335—TIPO—Nov. 6, 2012.

\* cited by examiner

MILLIMETER-WAVE COMMUNICATIONS FOR PERIPHERAL DEVICES

CLAIM OF PRIORITY UNDER 35 U.S.C. §119

The present Application for Patent claims priority to Provisional Application No. 60/997,439 filed Oct. 3, 2007 and hereby expressly incorporated by reference herein.

BACKGROUND

I. Field

The invention relates to a method and means of connecting devices in a Wireless Personal Area Network (WPAN) and Wireless Local Area Network (WLAN). In particular, but not exclusively, it relates to interfacing wired protocols with an IEEE 802.15.3 wireless protocol.

II. Description of the Related Art

WPANs and WLANs employing millimeter-wave communications will be used for short-range communication in home networks and between various Consumer Electronics devices. For the purposes of this disclosure, WPANs include ultra-wideband, short-range networks configured to transfer large volumes of data between personal devices and any larger networks with which those devices may interface. To facilitate such applications, an ultra-wideband network requires medium access control between a plurality of different high-data-rate devices. For example, the IEEE802.15.3 protocol may be used for peer-to-peer communication in a WPAN.

A millimeter-wave WPAN capable of providing data rates in excess of 6 Gbps for a range up to 10 m is currently being standardized in IEEE802.15.3c. A very high throughput WLAN standard for 60 GHz is also being considered under VHT60. One potential application of WPANs and WLANs is to provide wireless connectivity between peripheral devices in a computer network. For example, prior-art aspects of WPANs enable current wired protocols (USB, IEEE1394, PCIE, DVI/HDMI, SATA, 1 GbE, etc.) to be transmitted over a wireless channel. However, each of these wired protocols has very strict latency requirements and strict timing requirements between transmitting and receiving an acknowledgement message (e.g., an ACK or a NACK). Thus, an end-to-end wireless solution for peripherals employing wired protocols suffers from significant performance impediments due to latency in the wireless medium and protocol.

FIG. 1 illustrates a prior-art solution for providing wireless support to a plurality of different peripheral devices. For example, one peripheral device may have a USB interface, a second peripheral device may have a 1394 interface, a third device may have a PCIE interface, and a fourth device may have an HDMI interface. The prior-art solution provides for a protocol adaptation layer (PAL) 101-104 for each peripheral and a sub-MAC 111-114 for each peripheral. Furthermore, a wireless driver (not shown) is required on each end of each peripheral.

In a wireless system having a transmitting end and a receiving end, each end comprises a standard wired peripheral transceiver and a wireless transceiver. The transmitting end transmits a packet to the receiving end, and it sets up a timer and expects an ACK or NACK within a predetermined time (i.e., before the timer expires). However, due to latency in the wireless channel and the wireless protocol, the returned ACK or NACK often arrives too late (i.e., after the timer has expired), even if the receiving end receives the packet correctly. The transmitting end assumes that the packet is lost and takes action based on this incorrect assumption, such as retransmitting the packet and ratcheting down the transmission rate. This is only one of many issues that impede the performance of an end-to-end solution employing both wired and wireless protocols.

The WiMedia alliance addressed this issue with respect to the USB protocol. WiMedia defined a new protocol, Wireless USB (WUSB), which requires major changes to the USB MAC and provides a PAL and a new driver on each end to replace the wired existing driver. If this approach is used to provide wireless support for all the wired protocols for peripherals, it would require introducing a set of PALs for each wired protocol, reconfiguring the MAC for each peripheral, and providing a new set of wireless drivers to replace the existing wired drivers.

SUMMARY

Aspects disclosed herein may be advantageous to systems employing millimeter-wave WPANs, such as defined by the IEEE802.15.3c protocol. However, the invention is not intended to be limited to such systems, as other applications may benefit from similar advantages.

In one aspect of the invention, a wireless apparatus is configured for coupling a first device employing a wired-link protocol to a second device that may reside within or is associated with a wireless network such as a WPAN or WLAN. The apparatus comprises a wired interface, a wired transceiver that functions as a terminus for the first device, and a wireless transmitter.

In another aspect, a communication apparatus is configured for coupling a first device employing a wired protocol to a second device that may reside within or is associated with a wireless network such as a WPAN or WLAN. The communication apparatus comprises a wired transceiver and a wireless transceiver. The wireless transceiver functions as a terminus for the second device and such terminus function includes wirelessly receiving data from a second device. The wired transceiver is configured for transmitting the received data over a wired link that communicatively couples the apparatus and a first device.

The wireless transceiver means is configured to perform a terminus function for a wireless network. The wireless transceiver means may include, by way of example, but without limitation, a millimeter-wave transceiver, such as a wireless transceiver configured in accordance with the IEEE 802.15.3 wireless protocol.

Although some benefits and advantages of the preferred aspects are mentioned, the scope of the invention is not intended to be limited to particular benefits, uses, or objectives. Rather, aspects of the invention are intended to be broadly applicable to different wireless technologies, system configurations, networks, and transmission protocols, some of which are illustrated by way of example in the figures and in the following description of the preferred aspects. The detailed description and drawings are merely illustrative of the invention rather than limiting, the scope of the invention being defined by the appended claims and equivalents thereof. The use of the phrase at least one of "a", "b", and "c" as used herein shall mean "a", "b", "c", or any combination thereof.

BRIEF DESCRIPTION OF THE DRAWINGS

Aspects according to the invention are understood with reference to the following figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
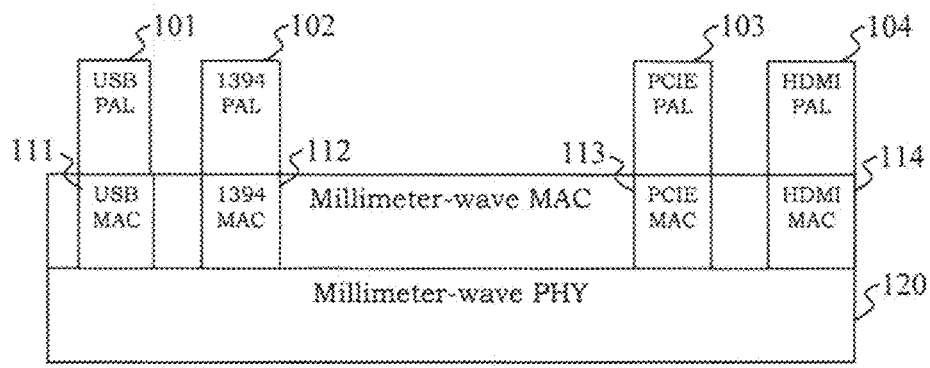
FIG. 1 is a block diagram illustrating a prior-art solution for providing wireless support to a plurality of different peripheral devices.
Figure 2:
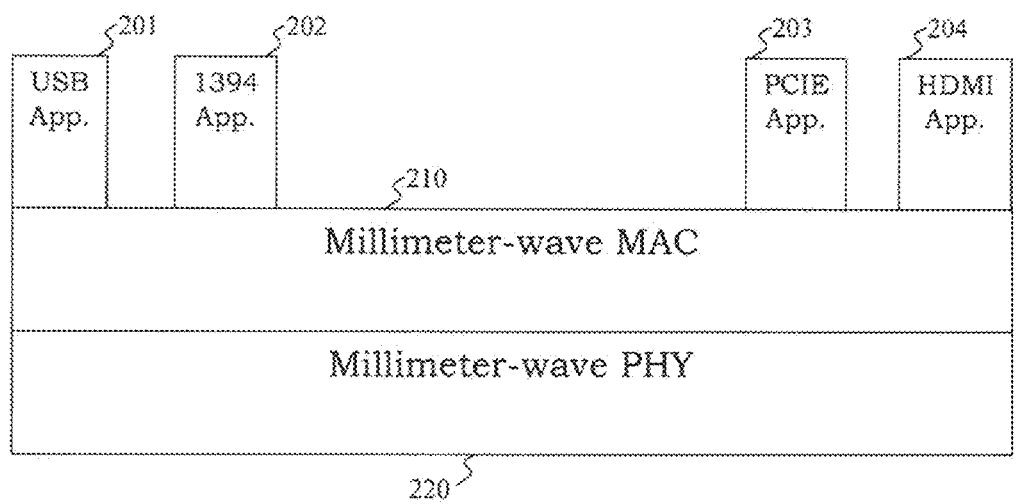
FIG. 2 is a block diagram of a conceptual model illustrating sample functional aspects of the invention.

FIG. 2 is a block diagram of a conceptual model illustrating functional aspects of the invention. Functional aspects of a system configured in accordance with an aspect of the invention may be depicted in layers, such as layers of the Open Systems Interconnection (OSI) Basic Reference Model.

A layer is a collection of conceptually similar functions that provide services to the layer above it and receives service from the layer below it. For example, a layer that provides error-free communications across a network provides the path needed by applications above it, while it calls the next lower layer to send and receive packets that make up the contents of the path.

In accordance with an aspect of the invention, a WPAN system comprises a millimeter-wave Physical Layer 220, a millimeter-wave MAC layer 210, and an application layer comprising a plurality of applications (such as a USB application 201, a 1394 application 202, a PCIE application 203, and an HDMI application 204) corresponding to each of the wired protocols employed by peripheral devices in the WPAN. With respect to the operation of the WPAN, the peripherals appear only as applications since there is no change to the existing millimeter-wave MAC for different types of peripheral devices, and aspects use existing wired drivers. One or more applications may incorporate an adaptation layer.

Figure 3A:
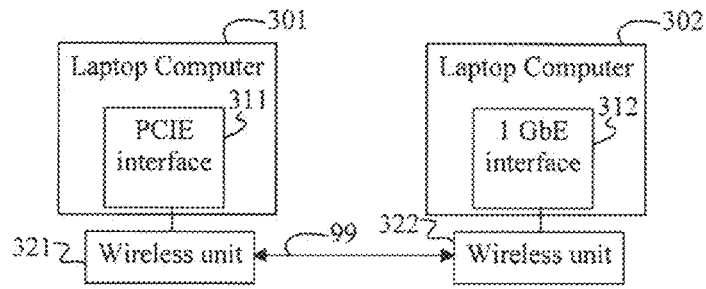
FIG. 3A illustrates a sample aspect of the invention configured to provide seamless wireless connectivity between a pair of wired devices employing different wired protocols.

FIG. 3A illustrates an aspect of the invention configured to provide seamless wireless connectivity between a pair of wired devices employing different wired protocols. A first laptop computer 301 having a PCIE peripheral interface 311 and a WPAN wireless unit 321 is communicatively coupled to a second laptop 302 with a 1 GbE peripheral interface 312 and a second WPAN wireless unit 322.

Figure 3B:
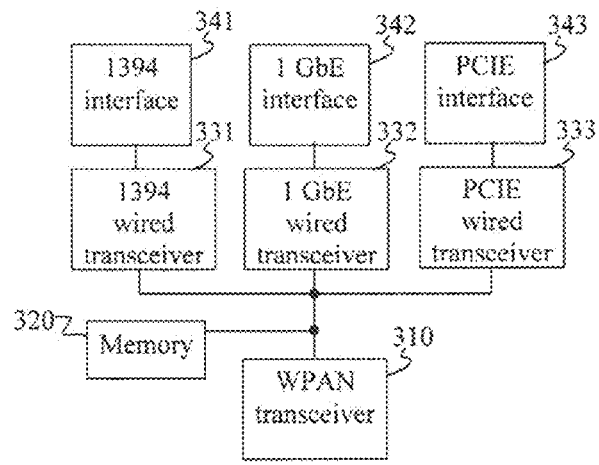
FIG. 3B is a block diagram of one of the wireless units shown in FIG. 3A.

FIG. 3B is a block diagram of one of the wireless units 321 and 322 shown in FIG. 3A. The wireless unit may have one or more wired interfaces (i.e., connectors), such as a 1394 interface 341, a 1 GbE interface 342, and a PCIE interface 343. Additional interfaces not shown may be included as well. The wireless unit may have one or more wired transceivers, such as a 1394 transceiver 331, a 1 GbE transceiver 332, and a PCIE transceiver 333. Each wired transceiver 331-333 is coupled to a corresponding one of the wired interfaces 341-343. The wireless unit further comprises a memory 320, and a wireless transceiver 310 comprising all of the PHY, MAC, and RF functionality needed to interface with the WPAN.

In one aspect, the wireless unit shown in FIG. 3B employs its PCIE interface 343 to connect to the first laptop computer's 301 PCIE peripheral interface 311. In another aspect, the wireless unit shown in FIG. 3B employs its 1 GbE interface 341 to connect to the second laptop's 302 1 GbE peripheral interface 312. When an application on the first laptop 301 transmits packets via its PCIE interface 311, the packets are received by the PCIE transceiver 333 residing in the wireless unit 321 instead of a PCIE transceiver (not shown) in the second laptop 302.

The PCIE transceiver 333 performs a terminus function for the wired link by acknowledging receipt of data transmitted via the laptop's 301 PCIE peripheral interface 311. For example, the PCIE transceiver 333 may perform a CRC of the received data and transmit a local acknowledgement message, such as a local ACK or a local NACK back to the laptop 301 depending on results of the CRC. In one aspect, the PCIE transceiver 333 may return a local NACK even if the CRC passes, such as to manage internal memory in the wireless unit. A local acknowledgement message, such as a local ACK or a local NACK, is defined herein to be an acknowledgement message transmitted between two terminuses of a local link, such as a wired link. A local link is a portion (i.e., a segment) of an end-to-end link. Thus, a local acknowledgement message is different from acknowledgement messages that transit the entire end-to-end link comprising a plurality of local links.

For purposes of this disclosure, a terminus to a wired link is a location in the link where data transmitted in accordance with a wired-link protocol is received and one or more terminus functions are performed with respect to the wired-link protocol. A terminus may also be known as an endpoint, and it may be a data source, a data sink, or both. Terminus functions include, by way of example, but without limitation, performing error detection of received data, performing error correction of received data, acknowledging receipt or non-receipt of data, regulating data flow, sending messages to other devices for regulating data flow, and decoding received data. A terminus, and thus, terminus functions are defined according to the corresponding wired protocol of the link. For example, a USB terminus is configured to send an ACK/NACK acknowledgement message according to the USB wired protocol. A terminus (and corresponding terminus functions) in other wired protocols may employ alternative mechanisms other than ACK/NACK.

In some cases, local acknowledgement messages transmitted in the wired link may be dictated by, or even originate from, a wireless apparatus. For example, the wireless unit 321 or 322 may return a NACK even though it received the packet correctly from the wired link. If the memory 320 is full, the wireless unit cannot store any more packets received from the wired link, so it may either transmit an interrupt into the wired link to halt transmissions, or it may keep sending local NACKs until its memory can accommodate more data. A terminus to a wired link may also be a location in the link where data is first transmitted in accordance with a wired-link protocol. A wired link typically comprises two terminuses. However, a wired link may comprise more than two terminuses.

The PCIE transceiver 333 is further configured for processing the received data, which is formatted with respect to the wired-link protocol. The resulting processed data has the wired-link formatting removed, and may be referred to as "raw data." The raw data is coupled to the wireless transceiver 310, which is configured to format the raw data with respect to the wireless protocol employed by the WPAN.

In aspects of the invention, the data transmitted in accordance with the wired protocol does not propagate over the wireless channel. Thus, timing and latency issues are mitigated. Furthermore, since the wired protocol (e.g., PCIE) is not transmitted over the wireless link, the wireless unit 322 may interface with a different wired interface (e.g., the 1 GbE interface 312) in the second laptop 302.

The wireless transceiver 310 is a terminus to the wireless link. For purposes of this disclosure, a terminus to a wireless link is a location in the link where data transmitted in accordance with a wireless protocol is received and processed as an endpoint, or destination in a communication link. A wireless terminus, and thus, terminus functions performed in a wireless link are defined according to the corresponding wireless protocol of the link. Terminus functions include, by way of example, but without limitation, performing error detection of received data, performing error correction of received data, acknowledging receipt or non-receipt of data, regulating data flow, sending messages to other devices for regulating data flow, and decoding received data. A terminus to a wireless link may also be a location in the link where data is first transmitted in accordance with the wireless protocol. A wireless link comprises at least two terminuses. However, a wireless network may comprise more than two terminuses.

Signals received from the WPAN by the wireless transceiver 310 have been formatted with respect to the wireless protocol. The wireless transceiver 310 processes these received signals to produce raw data, which is coupled to at least one of the wired transceivers, such as the PCIE transceiver 333. The PCIE transceiver 333 functions as a terminus to the wired link and accordingly formats the raw data with respect to the PCIE protocol for transmission over the wired link to the laptop 301. Another function of a terminus of a wired link is to respond to messages sent via the wired protocol. For example, the PCIE transceiver 333 may retransmit data in response to a local NACK received from the wired transceiver (not shown) in the laptop 301.

Figure 3C:
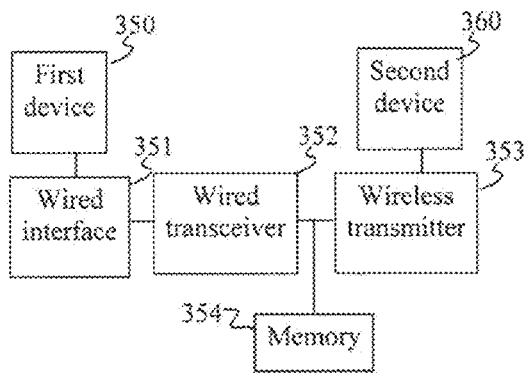
FIG. 3C is a block diagram of a sample apparatus comprising a wired interface means, a wired transceiver means, and a wireless transceiver means configured in accordance with the invention.

FIG. 3C is a block diagram of an apparatus configured in accordance with an aspect of the invention. A means for coupling the apparatus to a first device 350 comprises a wired interface 351, which is configured for providing a wired link between the apparatus to a first device. A means for terminating the wired link comprises at least one wired transceiver, such as wired transceiver 352, which is configured for functioning as a terminus of the wired link. Terminus functions performed by the wired transceiver 352 include receiving data from the first device 350. A means for wirelessly transmitting comprises a wireless transmitter 353, which is configured for wirelessly transmitting the received data to a second device 360. The apparatus may further comprise a means for storing data, such as a memory 354 configured for storing data received from the first device 350 or the second device 360.

The wired interface 351 may include one or more wired interfaces, such as a USB interface, an IEEE1394 interface, a PCIE interface, a DVI/HDMI interface, a SATA interface, and a 1 GbE interface (or any combination thereof). The wired transceiver 352 is coupled to the wired interface 351, and may include at least one wired transceiver, such as a USB transceiver, an IEEE1394 transceiver, a PCIE transceiver, a DVI/HDMI transceiver, a SATA transceiver, and a 1 GbE transceiver, or any combination thereof.

The wireless transmitter 353 is coupled to the wired transceiver 352, and may be configured for receiving and acknowledging data from a wireless link, such as a wireless link in a WPAN or a WLAN. The wireless transmitter 353 may comprise a millimeter-wave transceiver, such as a wireless transceiver configured in accordance with the IEEE 802.15.3 wireless protocol.

In one aspect of the invention, the terminus function further comprises transmitting an acknowledgement message to the first device 350 in response to the data reception. The wired transceiver 352 may be configured for determining whether the received data are correct. For example, determination may comprise performing a cyclic redundancy check of the received data. The acknowledgment message may comprise an ACK message if the received data are correct data or a NACK message if the received data are not correct. In another aspect of the invention, the acknowledgement message comprises an ACK message if there is sufficient memory for storing the received data or a NACK if there is insufficient memory for storing the received data. For example, if the second device 360 is unable to accept the received data, and the memory 354 is full, the wired transceiver 352 may be configured for send a NACK or interrupt message to the first device 350 in order to interrupt or delay data flow.

Figure 3D:
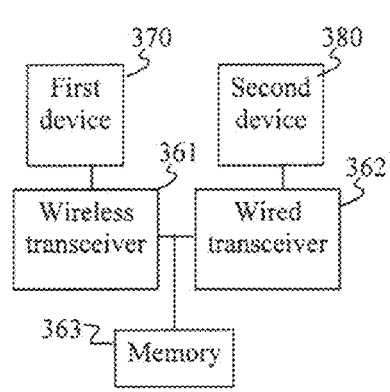
FIG. 3D is a block diagram of a sample apparatus comprising a wired transceiver means and a wireless transceiver means configured in accordance with the invention.

FIG. 3D is a block diagram of an apparatus configured in accordance with an aspect of the invention. A means for terminating a wireless link for a first device 350 may comprise a wireless transceiver 361, which is configured for functioning as a terminus of the first device 370, wherein the terminus function comprises wirelessly receiving data from a first device 370. A means for transmitting the received data over a wired link may comprise at least one wired transceiver, such as wired transceiver 362, which communicatively couples the apparatus and a second device 380. The apparatus may further comprise a means for storing data, such as a memory 363, which is configured for storing data received from the wireless network.

In one aspect of the invention, the terminus function further comprises wirelessly transmitting an acknowledgment message to the first device 370 in response to the data reception. The wireless transceiver 361 may be configured for determining whether the received data are correct. For example, the determination may comprise performing a cyclic redundancy check of the received data. In one aspect of the invention, the wireless transceiver 361 may transmit an acknowledgment message comprising an ACK message if the received data are correct data or a NACK message if the received data are not correct. The terminus function may further comprise wirelessly transmitting a NACK message to the first device 370 based on a NACK received by the wired transceiver 362. In another aspect of the invention, the acknowledgment message may comprise an ACK message if there is sufficient memory for storing the received data or a NACK message if there is insufficient memory for storing the received data. For example, a NACK message may be sent to the first device if the second device is unable to accept data, and the memory 363 becomes full.

The means for terminating the wireless link, such as the wireless transceiver 361 may be a millimeter-wave transceiver configured in accordance with the IEEE 802.15.3 wireless protocol. The means for transmitting the received data over the wired link, such as the wired transceiver 362 may be configured with respect to at least one of a USB protocol, an IEEE1394 protocol, a PCIE protocol, a DVI/HDMI protocol, a SATA protocol, and a 1 GbE protocol.

Figure 4:
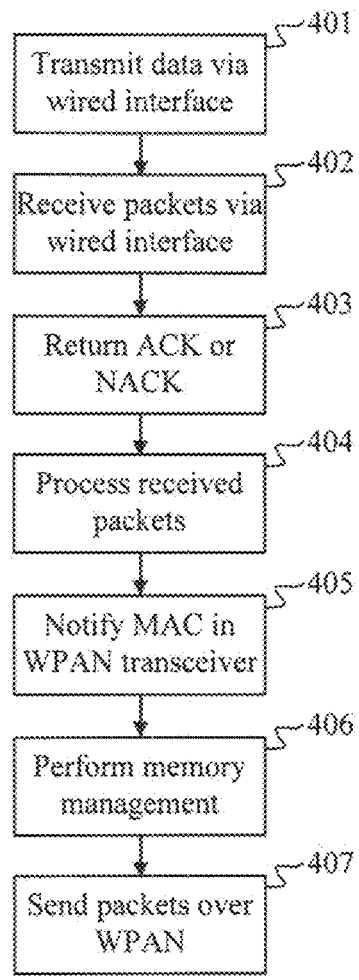
FIG. 4 illustrates a sample method of communicating information in a WPAN in accordance with the invention.

FIG. 4 is a flow diagram illustrating a method of communicating information in a WPAN in accordance with an aspect of the invention. A first electronic device (such as the first laptop 301 shown in FIG. 3A) transmits data packets via a wired interface (e.g., its PCIE interface 311) 401. A wireless unit (such as the first wireless unit 321) receives the data packets via a corresponding PCIE interface (e.g., the PCIE interface 343 shown in FIG. 3B) 402. Upon packet reception 402 by the wired transceiver (e.g., PCIE transceiver 333), the wireless unit 321 performs the following terminus functions. The PCIE transceiver 333 may perform a CRC, and then send an acknowledgement message (e.g., an ACK or NACK depending on the result of a CRC) 403 back to the PCIE transceiver (not shown) in the first laptop 301. In some aspects, the wireless unit 321 may be configured to send a NACK even if it received the packet correctly. For example, if the wireless link in the WPAN is much slower than the wired link, or there is congestion in the wireless channel, or the shared memory 320 is full, wireless unit 321 may send a NACK back to the laptop 301 such that the packets are retransmitted at a later time when they can be processed by the wireless unit 321. In some aspects, the wireless unit 321 may be configured to send a NACK without first performing a CRC.

The wireless unit 321 processes the packets 404. For example, the wireless unit 321 may store the packets in the shared (or dedicated) memory 320, or the PCIE transceiver 333 may pass the packets through to the WPAN transceiver 310. The MAC in the WPAN transceiver 310 is notified that packets are ready for transmission 405. For example, the PCIE transceiver 333 acts as an application that has a packet to send. Memory management 406 is performed. For example, if the memory 320 is full, the wireless unit 321 signals the PCIE transceiver (via interface PCIE 311) on the laptop 301 to stop transmission. Transmission is restarted once the memory is no longer full. The WPAN transceiver 310 formats and sends the packet over the wireless channel 407.

For some wired protocols, instead of sending a NACK to indicate that the memory 320 is full, an interrupt is transmitted to the sending device (e.g., laptop 302) to slow down data transmissions. A terminus function may also include other messaging protocols that may be employed for regulating data transfer. Furthermore, in some cases, such as in 1 Gigabit Ethernet in UDP mode, no acknowledgment message is returned.

Figure 5:
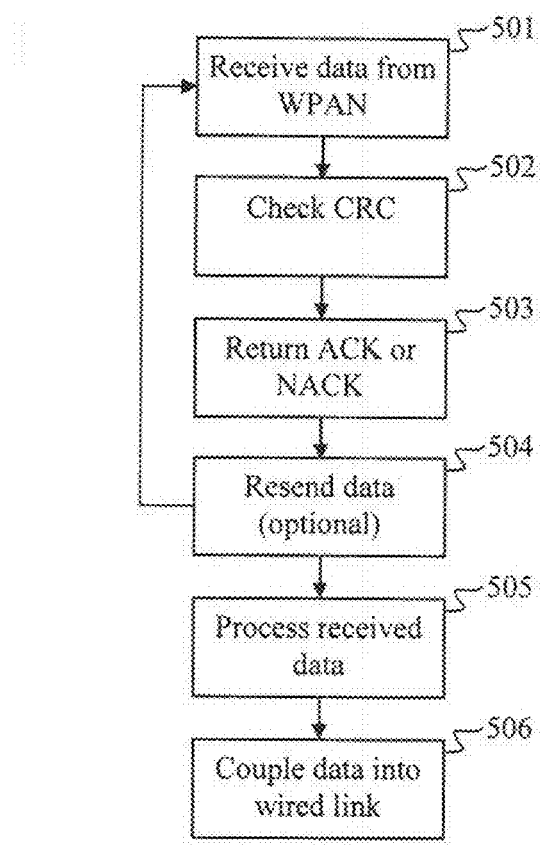
FIG. 5 is a flow diagram of a sample communication method for coupling an electronic device configured for employing a wired protocol to a WPAN.

FIG. 5 is a flow diagram of a communication method for coupling an electronic device configured for employing a wired protocol to a WPAN. The second wireless unit 322 (shown in FIG. 3A) receives a packet 501 from the WPAN and checks the CRC 502 before returning an acknowledgment message (e.g., an ACK or NACK) 503 to the first wireless unit 321. Alternatively, the second wireless unit 322 may return the acknowledgment message 503 after receiving an ACK or NACK from the 1 GbE transceiver in the second laptop 302. The first wireless unit 321, upon receiving a NACK from the second wireless unit 322, may retrieve the packet from the memory 320 and resend it 504. If the resend step 504 is performed, steps 501-503 are repeated. The resend step 504 may be repeated until the acknowledgement step 503 provides an ACK message to the first wireless unit 321 or until a predetermined maximum number of retransmissions is reached.

Once received correctly, the second wireless unit 322 processes the received data 505. For example, the wireless unit 322 may store the received data in memory or pass it to one of the peripheral (wired) transceivers, such as the 1 GbE wired transceiver 332. The 1 GbE wired transceiver 332 transmits the data 506 in accordance with the 1 GbE protocol to the 1 GbE transceiver (not shown) on the second laptop 302 via its 1 GbE interface 312.

Figure 6:
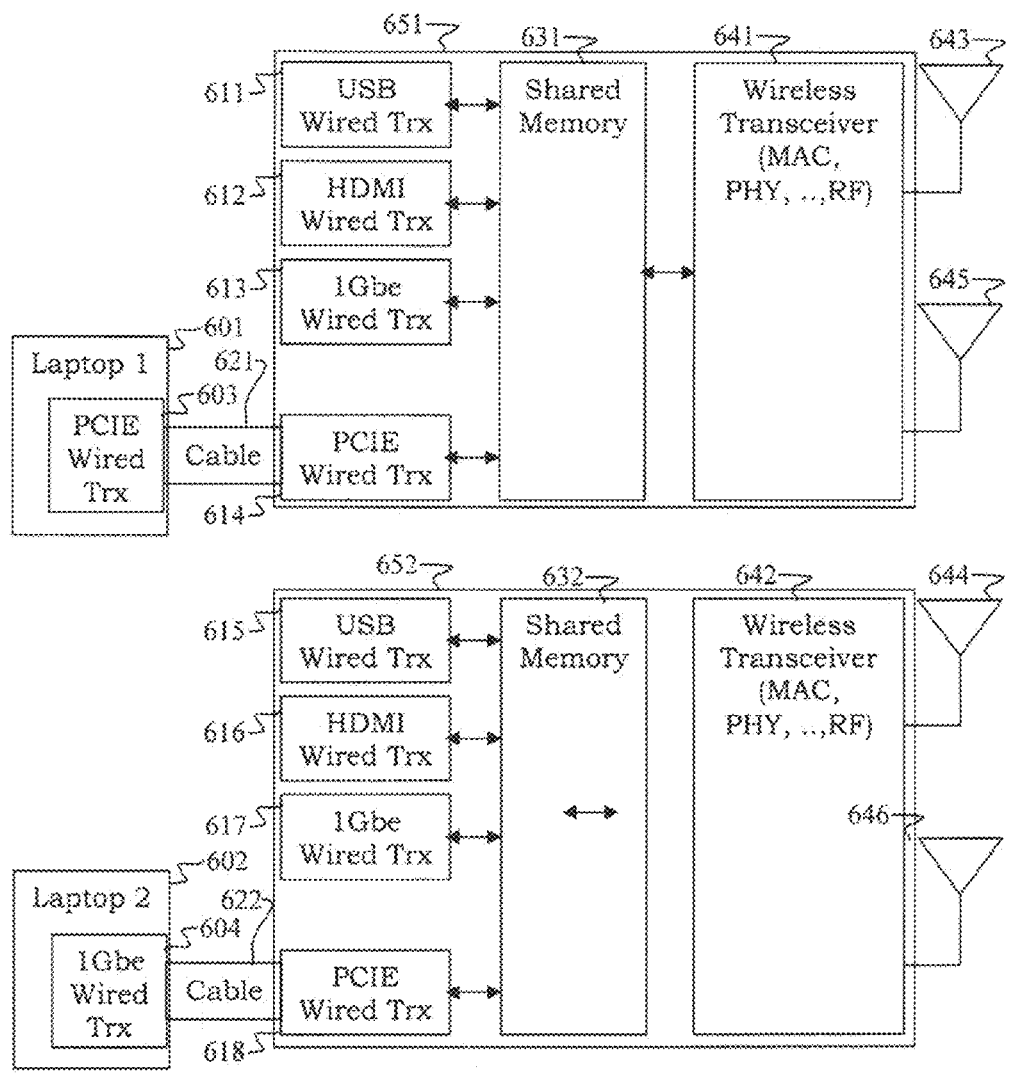
FIG. 6 is a block diagram of a sample communication system configured in accordance with the invention.

FIG. 6 is a block diagram of a communication system configured in accordance with an aspect of the invention. Two laptop computers 601 and 602 are communicatively coupled via a wireless link that employs PCIE transceivers 603 and 604 in each laptop 601 and 602, respectively.

A first wireless unit 651 is coupled to the first laptop 601 by a first cable 621. The cable 621 connects the PCIE transceiver 603 in the first laptop 601 to a PCIE transceiver 614 in the first wireless unit 651. The PCIE transceiver 614 may be one of a plurality of wired transceivers 611-614 in the first wireless unit 651. The wireless unit 651 further comprises a shared memory 631 for storing data, and a wireless transceiver 641 comprising one or more antennas, such as antennas 643 and 645.

A second wireless unit 652 is coupled to the second laptop 602 by a second cable 622. The cable 622 connects the PCIE transceiver 604 in the second laptop 602 to a PCIE transceiver 618 in the second wireless unit 652. The PCIE transceiver 618 may be one of a plurality of wired transceivers 615-618 in the second wireless unit 652. The wireless unit 652 further comprises a shared memory 632 for storing data, and a wireless transceiver 642 comprising one or more antennas, such as antennas 644 and 646.

In one aspect of the invention, the pair of wireless units 651 and 652 enables wired devices (e.g., the laptops 601 and 602) configured to operate with respect to dissimilar wired protocols to communicate with each other via a wireless interface. In alternative aspects, one of the wireless units 651 or 652 may communicate with another wireless device that is not configured for peripheral (wired) communications. In another aspect, the pair of wireless units 651 and 652 is configurable for functioning as an adaptor. For example, the first wireless unit 651 couples to any of a plurality of wired interfaces, whereas the second wireless unit 652 couples to just one wired interface, such as PCIE. Thus, an aspect of the invention may function as a bridge between any of the plurality of wired interfaces to a single wired interface.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

Figure 7:
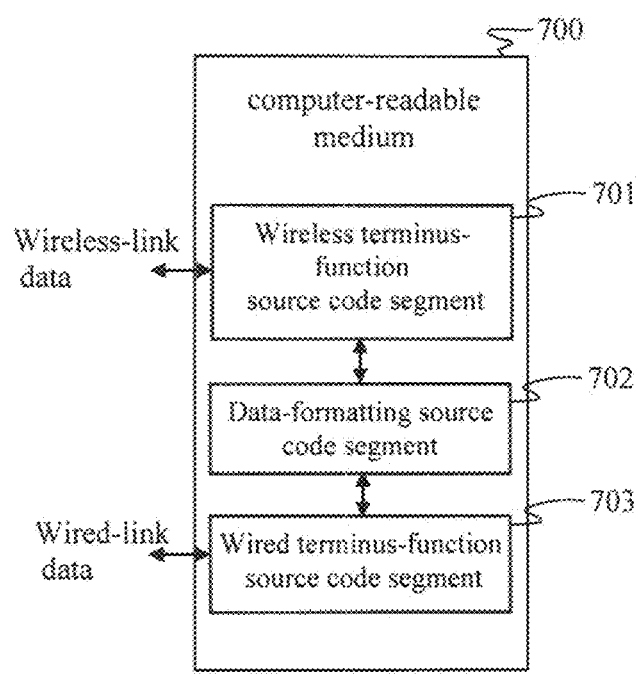
FIG. 7 illustrates sample software components residing on a computer-readable memory configured in accordance with the invention.

FIG. 7 illustrates software components residing on a computer-readable memory 700 and configured in accordance with an aspect of the invention. In this description, the term "memory" refers to data stores, algorithm stores, and other information stores. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

A wireless terminus function source-code segment 701 is configured for receiving wireless data from a WPAN and performing terminus functions for a wireless link of the WPAN. For example, the source-code segment 701 may perform a CRC on the data received from the WPAN and return an acknowledgement message. The source-code segment 701 may be responsive to messages received from the WPAN, such as for controlling the flow of data transmitted into the WPAN.

A data-formatting source code segment 702 is configured for formatting data received from the wireless link for transmission over a wired link. The source code segment 702 is further configured for formatting data received from the wired link for transmission over a wireless link.

A wired terminus function source-code segment 703 is configured for receiving data from a wired link and performing terminus functions for the wired link. For example, the source-code segment 703 may perform a CRC on data received from the wired link and return an acknowledgement message. The source-code segment 703 may be responsive to messages received from the WPAN by source-code segment 701 for controlling the flow of data received from a device at the other end of the wired link. The source-code segment 703 may be configured for storing data received from the wired link in a memory.

The invention is not intended to be limited to the preferred aspects. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the invention may be implemented via any combination of programming languages, including Java, C, C++, Matlab™, Verilog, VHDL, and/or processor specific machine and assembly languages.

The method and system aspects described herein merely illustrate particular aspects of the invention. It should be appreciated that those skilled in the art will be able to devise various arrangements, which, although not explicitly described or shown herein, embody the principles of the invention and are included within its scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and aspects of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the invention. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

What is claimed is:

1. An apparatus for communicating, comprising:
    at least one wired interface configured to provide a wired link coupling the apparatus to a first device via a first protocol;
    at least one wired transceiver configured to function as a terminus of the wired link, wherein the terminus function comprises receiving data from the first device;
    a memory configured to store the data received from the first device; and
    a wireless transmitter configured to wirelessly transmit the received data to a second device via a second protocol,
    wherein the terminus function further comprises transmitting a response to the first device in response to the data reception using the first protocol,
    wherein the response comprises a signal configured to interrupt a rate of transmission from the first device if there is insufficient space in the memory to store the received data, and
    wherein the first protocol and the second protocol are configured to allow the first device and the second device, respectively, to communicate without requiring the first device to understand the second protocol and the second device to understand the first protocol.

2. The apparatus recited in claim 1, wherein the at least one wired interface and the at least one wired transceiver are configured to communicate with respect to at least one of a USB protocol, an IEEE1394 protocol, a PCIE protocol, a DVI/HDMI protocol, a SATA protocol, and a 1 GbE protocol.

3. The apparatus recited in claim 1, wherein the at least one wired transceiver is configured to determine whether the received data is correct.

4. The apparatus recited in claim 3, wherein the response comprises an acknowledgment message that comprises an ACK message if the received data is correct or a NACK message if the received data is not correct.

5. The apparatus recited in claim 3, wherein the determination comprises performing a cyclic redundancy check of the received data.

6. A method for communicating, comprising:
    providing a wired-link communication coupling an apparatus to a first device via a first protocol;

performing at least one terminus function for the first device, wherein the terminus function comprises receiving data from the first device;
storing the data received from the first device in a memory; and
wirelessly transmitting the received data to a second device via a second protocol,
wherein the at least one terminus function further comprises transmitting a response to the first device in response to the data reception using the first protocol, and
wherein the response comprises a signal configured to interrupt a rate of transmission from the first device if there is insufficient space in the memory to store the received data, and
wherein the first protocol and the second protocol are configured to allow the first device and the second device, respectively, to communicate without requiring the first device to understand the second protocol and the second device to understand the first protocol.

7. The method recited in claim 6, wherein providing for wired-link communication comprises configuring the wired-link communication to communicate with respect to at least one of a USB protocol, an IEEE1394 protocol, a PCIE protocol, a DVI/HDMI protocol, a SATA protocol, and a 1 GbE protocol.

8. The method recited in claim 6, wherein the at least one terminus function further comprises determining whether the received data is correct.

9. The method recited in claim 8, wherein the at least one terminus function further comprises returning an ACK message if the received data is correct or a NACK message if the received data is not correct.

10. The method recited in claim 8, wherein the determination comprises performing a cyclic redundancy check of the received data.

11. An apparatus for communicating, comprising:
means for providing for wired-link communication coupling the apparatus to a first device via a first protocol;
means for performing at least one terminus function on the wired link, wherein the terminus function comprises receiving data from the first device;
means for storing the data received from the first device in a memory; and
means for wirelessly transmitting the received data to a second device via a second protocol,
wherein the means for performing at least one terminus function further comprises a means for transmitting a response to the first device in response to the data reception using the first protocol, and
wherein the response comprises a signal configured to interrupt a rate of transmission from the first device if there is insufficient space in the memory for storing the received data, and
wherein the first protocol and the second protocol are configured to allow the first device and the second device, respectively, to communicate without requiring the first device to understand the second protocol and the second device to understand the first protocol.

12. The apparatus recited in claim 11, wherein the means for providing for wired-link communication is configured to communicate with respect to at least one of a USB protocol, an IEEE1394 protocol, a PCIE protocol, a DVI/HDMI protocol, a SATA protocol, and a 1 GbE protocol.

13. The apparatus recited in claim 11, wherein the means for performing at least one terminus function further comprises means for determining whether the received data is correct.

14. The apparatus recited in claim 13, wherein the means for performing at least one terminus function further comprises means for returning an ACK message if the received data is correct or a NACK message if the received data are not correct.

15. The apparatus recited in claim 13, wherein the means for determining comprises means for performing a cyclic redundancy check of the received data.

16. A non-transitory computer-readable medium encoded with instructions executable to:
provide for wired-link communication coupling an apparatus to a first device via a first protocol;
perform at least one terminus function on the wired link, wherein the terminus function comprises receiving data from the first device;
store the data received from the first device in a memory; and
wirelessly transmit the received data to a second device via a second protocol,
wherein the at least one terminus function further comprises transmitting a response to the first device in response to the data reception using the first protocol,
wherein the response comprises a signal configured to interrupt a rate of transmission from the first device if there is insufficient space in the memory for storing the received data, and
wherein the first protocol and the second protocol are configured to allow the first device and the second device, respectively, to communicate without requiring the first device to understand the second protocol and the second device to understand the first protocol.

17. An apparatus for communicating comprising:
a wireless transceiver configured to:
function as a terminus of a first device, wherein the terminus function comprises wirelessly receiving data from the first device via a first protocol;
a memory configured to store the data received from the first device; and
at least one wired transceiver configured to transmit the received data over a wired link that communicatively couples the apparatus and a second device via a second protocol,
wherein the terminus function comprises wirelessly transmitting a response to the first device in response to the data reception using the first protocol,
wherein the response comprises a signal configured to interrupt a rate of transmission from the first device if there is insufficient space in the memory for storing the received data, and
wherein the first protocol and the second protocol are configured to allow the first device and the second device, respectively, to communicate without requiring the first device to understand the second protocol and the second device to understand the first protocol.

18. The apparatus recited in claim 17, wherein the at least one wired transceiver is configured to communicate with respect to at least one of a USB protocol, an IEEE1394 protocol, a PCIE protocol, a DVI/HDMI protocol, a SATA protocol, and a 1 GbE protocol.

19. The apparatus recited in claim 17, wherein the terminus function comprises determining whether the received data is correct.

20. The apparatus recited in claim 19, wherein the response comprises an acknowledgment message that comprises an ACK message if the received data is correct or a NACK message if the received data is not correct.

21. The apparatus recited in claim 19, wherein the determination comprises performing a cyclic redundancy check of the received data.

22. The apparatus recited in claim 17, wherein the at least one terminus function further comprises wirelessly transmitting a NACK message to the first device based on a NACK message received by the at least one wired transceiver.

23. A method for communicating comprising:
performing at least one terminus function for a first device, wherein the terminus function comprises wirelessly receiving, at an apparatus, data from the first device via a first protocol;
storing the data received from the first device in a memory of the apparatus; and
transmitting the received data over a wired link that communicatively couples the apparatus and a second device via a second protocol,
wherein the at least one terminus function comprises wirelessly transmitting a response to the first device in response to the data reception using the first protocol,
wherein the response comprises a signal configured to interrupt a rate of transmission from the first device if there is insufficient space in the memory for storing the received data, and
wherein the first protocol and the second protocol are configured to allow the first device and the second device, respectively, to communicate without requiring the first device to understand the second protocol and the second device to understand the first protocol.

24. The method recited in claim 23, wherein the transmission of the received data is configured with respect to at least one of a USB protocol, an IEEE1394 protocol, a PCIE protocol, a DVI/HDMI protocol, a SATA protocol, and a 1 GbE protocol.

25. The method recited in claim 23, wherein the at least one terminus function comprises determining whether the received data is correct.

26. The method recited in claim 25, wherein the response comprises an acknowledgment message that comprises an ACK message if the received data is correct or a NACK message if the received data is not correct.

27. The method recited in claim 25, wherein the determination comprises performing a cyclic redundancy check of the received data.

28. The method recited in claim 23, wherein the at least one terminus function further comprises wirelessly transmitting a NACK message to the first device based on a NACK message received by the at least one wired transceiver.

29. An apparatus for communicating comprising:
means for performing at least one terminus function for a first device, wherein the terminus function comprises wirelessly receiving data from the first device via a first protocol;
means for storing the data received from the first device in a memory of the apparatus; and
means for transmitting the received data over a wired link that communicatively couples the apparatus and a second device via a second protocol,
wherein the means for performing at least one terminus function comprises a means for wirelessly transmitting a response to the first device in response to the data reception using the first protocol,
wherein the response comprises a signal configured to interrupt a rate of transmission from the first device if there is insufficient space in the means for storing the data received from the first device to store the received data, and
wherein the first protocol and the second protocol are configured to allow the first device and the second device, respectively, to communicate without requiring the first device to understand the second protocol and the second device to understand the first protocol.

30. The apparatus recited in claim 29, wherein the means for transmitting is configured with respect to at least one of a USB protocol, an IEEE1394 protocol, a PCIE protocol, a DVI/HDMI protocol, a SATA protocol, and a 1 GbE protocol.

31. The apparatus recited in claim 29, wherein the means for performing at least one terminus function comprises means for determining whether the received data is correct.

32. The apparatus recited in claim 31, wherein the response comprises an acknowledgment message that comprises an ACK message if the received data is correct data or a NACK message if the received data is not correct.

33. The apparatus recited in claim 31, wherein the means for determination comprises means for performing a cyclic redundancy check of the received data.

34. The apparatus recited in claim 29, wherein the means for performing the at least one terminus function further comprises means for wirelessly transmitting a NACK message to the first device based on a NACK message received by the at least one wired transceiver.

35. A non-transitory computer-readable medium encoded with instructions executable to:
perform at least one terminus function for a first device, wherein the terminus function comprises wirelessly receiving data, at an apparatus, from the first device via a first protocol;
store the data received from the first device in a memory of the apparatus; and
transmit the received data over a wired link that communicatively couples the apparatus and a second device via a second protocol,
wherein the at least one terminus function comprises wirelessly transmitting a response to the first device in response to the data reception using the first protocol,
wherein the response comprises a signal configured to interrupt a rate of transmission from the first device if there is insufficient space in the memory to store the received data, and
wherein the first protocol and the second protocol are configured to allow the first device and the second device, respectively, to communicate without requiring the first device to understand the second protocol and the second device to understand the first protocol.

36. A wireless unit, comprising:
at least one wired interface configured to provide a wired link coupling the wireless unit to a first device via a first protocol;
at least one wired transceiver configured to function as a terminus of the wired link, wherein the terminus function comprises receiving data from the first device;
a memory configured to store the data received from the first device; and
a wireless transmitter comprising one or more antennas configured to wirelessly transmit the received data to a second device via the one or more antennas using the second protocol, wherein the terminus function further comprises transmitting a response to the first device in response to the data reception using the first protocol, wherein the response comprises a signal configured to interrupt a rate of transmission from the first device if there is insufficient space in the memory to store the received data, and wherein the first protocol and the second protocol are configured to allow the first device and the second device, respectively, to communicate without requiring the first device to understand the second protocol and the second device to understand the first protocol.

37. A wireless unit, comprising:

a wireless transceiver comprising one or more antennas configured to:

function as a terminus of a first device, wherein the terminus function comprises wirelessly receiving data from the first device via the one or more antennas and a first protocol;

a memory configured to store the data received from the first device; and at least one wired transceiver configured to transmit the received data over a wired link that communicatively couples the wireless unit and a second device via a second protocol, wherein the terminus function comprises wirelessly transmitting, via the one or more antennas, a response to the first device in response to the data reception using the first protocol, wherein the response comprises a signal configured to interrupt a rate of transmission from the first device if there is insufficient space in the memory to store the received data, and wherein the first protocol and the second protocol are configured to allow the first device and the second device, respectively, to communicate without requiring the first device to understand the second protocol and the second device to understand the first protocol.

\* \* \* \* \*